United States Patent [19]
Sorimachi et al.

[11] 3,797,029
[45] Mar. 12, 1974

[54] VARIABLE RESISTOR FOR A CAMERA

[75] Inventors: Kanehiro Sorimachi, Yokohama; Mutsuhide Matsuda, Tokyo, both of Japan

[73] Assignee: Canon Kabushiki Kaisha, Tokyo, Japan

[22] Filed: Nov. 13, 1972

[21] Appl. No.: 306,036

Related U.S. Application Data

[63] Continuation of Ser. No. 174,720, Aug. 25, 1971, abandoned.

[30] Foreign Application Priority Data
Aug. 27, 1970 Japan.......................... 45-85289[U]

[52] U.S. Cl................................................ 354/235
[51] Int. Cl. .............................................. G03b 9/62
[58] Field of Search... 95/10 C, 10 CT, 53 E, 53 EB

[56] References Cited
UNITED STATES PATENTS

3,468,235  9/1969  Rittman ................................. 95/53
3,537,366  11/1970  Engelsmann et al..................... 95/10
3,613,534  10/1971  Yayaki et al............................. 95/10

*Primary Examiner*—Joseph F. Peters, Jr.
*Assistant Examiner*—Michael L. Gellner
*Attorney, Agent, or Firm*—Toren and McGeady

[57] ABSTRACT

A variable resistor in the exposure control circuit of a camera is set to respond to two or more exposure-determining factors, such as film sensitivity, shutter speed, diaphragm value, distance to the object during flashing, etc. The resistor is composed of a plurality of conductive paths connected to terminals of a resistor and an armature in contact with the conductive paths and shifting from one conductive path to the next. The conductive paths are arranged so that movement in either one of the transverse directions produces a shift in contact between the conductive paths. Camera controls move the armature in the paths relative to each other. The armature and the paths are connected in th control circuit of the camera.

10 Claims, 4 Drawing Figures

PATENTED MAR 12 1974

INVENTORS
KANEHIRO SORIMACHI
ROKUHIDE MATSUDA

BY Toren and McGeady
ATTORNEYS

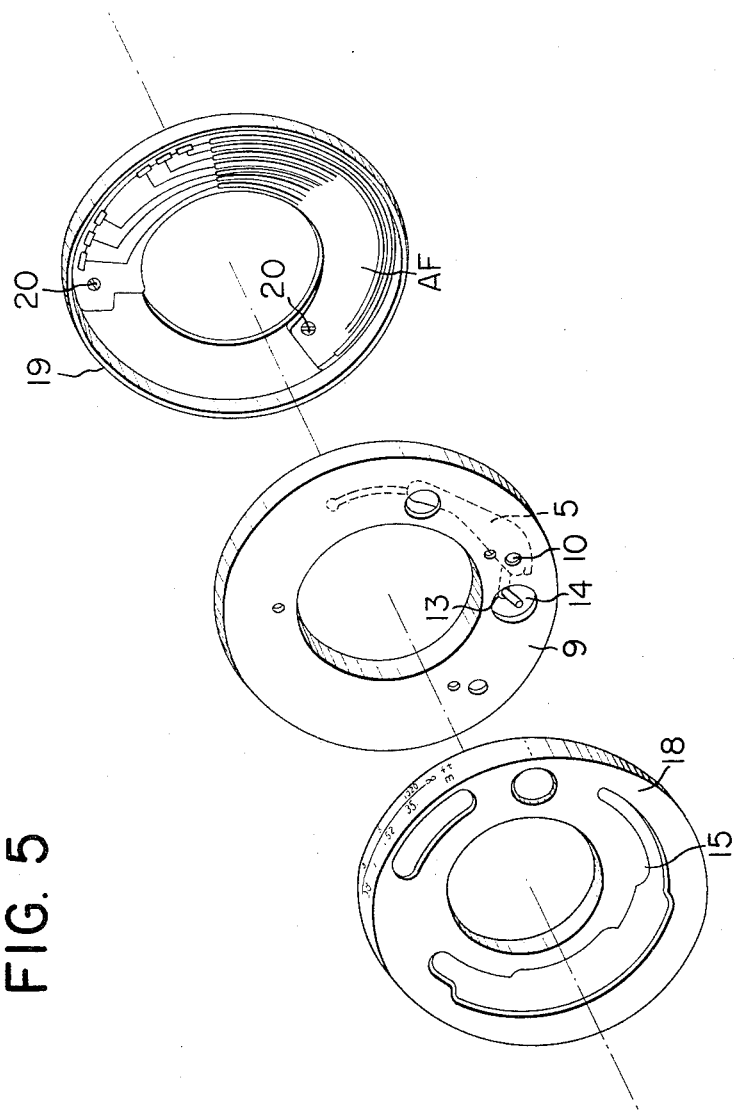

VARIABLE RESISTOR FOR A CAMERA

This is a continuation of application Ser. No. 174,720 filed on Aug. 25, 1971, now abandoned.

The present invention relates to a variable resistor which puts in two or more of such exposure extermining factors as film sensitivity, shutter speed, diaphragm value, object distance at the time of flash photography, and information on the amount of illumination for flash, etc., as resistance value into an electronic shutter circuit or an ammeter circuit etc.

Theretofore as the above mentioned means to enter exposure determining factors to an electronic shutter, a sliding resistor linked with a film sensitivity setting ring, a shutter speed setting ring, a diaphragm value setting ring, a distance ring, amount-of-flash-illumination setting ring, etc., has been used. Such sliding resistors occupy rather large space and constitutes problem in designing a camera. On the other hand use has been made of a sliding resistor whose resistance value is set by two sliding pieces which move independently to set exposure determining factors. However, it is difficult to obtain such resistance value and precisely correspond to the amount of shifting of the sliding pieces.

The present invention relates to a variable resistor in which selectors are shifted by a member to set an exposure determining factor, and a conductive element to which the selector is contacting is shifted by another member to set exposure determining factor, then a specific resistance element is selected by the contacting position of the selector and the conductive element, thereby two or more exposure determining factors are put in to an electronic shutter circuit or an ammeter circuit, etc., as resistance value.

The first object of the present invention is to offer a variable resistor which puts in two or more exposure determining factors to an electronic shutter circuit or an ammeter circuit, etc., as resistance value.

The second object of the present invention is to provide a variable resistor which generates a resistance value precisely corresponding to two or more exposure determining factors.

The third object of the present invention is to provide a variable resistor which occupy smaller space.

The present invention shall be explained further in detail according to the attached drawings.

FIG. 5 is a drawing showing a state wherein the variable resistor of FIG. 1 is built in a specular bronze of a lens for a camera.

Figure 1:
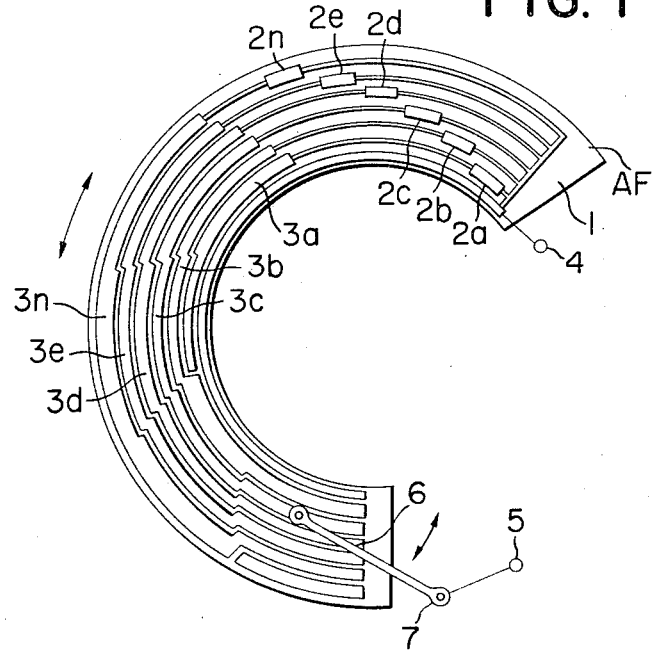
FIG. 1 is a drawing showing variable resistor of Example 1 of the present invention.

In the drawings, a printed circuit board AF moves with a first member for setting exposure determining factor (not shown in Drawing). The printed circuit board AF is composed of an insulation base plate 1 made of phenolic resin or epoxy resin, resistance elements 2a to 2n of alumina, etc., in pellet form provided in parallel on the insulation base plate 1, copper foil printed by methods such as evaporating deposition, photo-conductive elements 3a to 3n, and a terminal 4.

Figure 3:
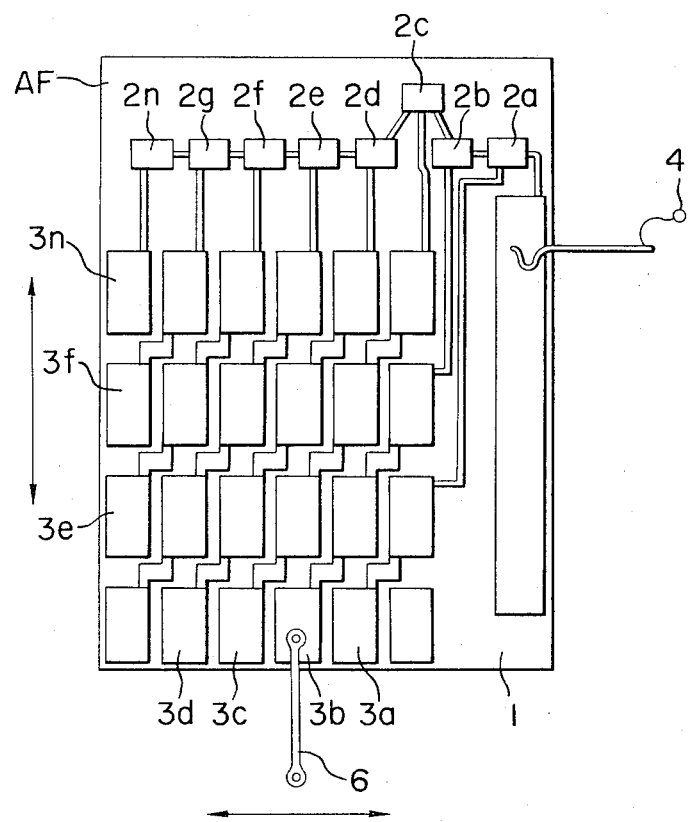
FIG. 3 is a drawing showing the variable resistor of Example 3 of the present invention.

The insulation plate 1 is shown in FIG. 1 in a horseshoe-like shape being made by cutting away a portion of a hollow disk and is rotatable as shown by an arrow, and this shape is particularly advantageous for housing the printed circuit board within a. However, the shape of the insulation base plate is not limited to said shape and may be, for example as shown in FIG. 3, a square or a rectangular Element 5 is a terminal. A selector 6 moves with a second member that sets a second exposure determining factor (not shown in the drawing). In this drawing the selector 6 rotates around a center, an axle 7, as shown by an arrow. Therefore, the contacting position of the selector 6 and the printed circuit board AF is determined by the rotation of the selector 6 and the rotation of the printed circuit board AF.

This position varies by the combination of the set values of the first and the second members for setting exposure determining factors, and thus varied position can be detected beforehand by the amount of movement of the selector 6 and the printed circuit board AF against the set values. Therefore, when a prescribed resistance value is to be obtained by certain set values of the first and second members for setting exposure determining elements, the pattern of the conductive elements 3a to 3n which are connected to the resistance elements 2a to 2n may be drawn on the printed circuit board AF so as to correspond to the above mentioned varied position. That is, in FIG. 1 even if selectors 6 have same position in radial direction on the printed circuit board AF, the conductive elements 3a to 3n which are bent to inner direction are drawn in parallel to each other so as to select other resistance elements 2a to 2n by rotating the printed circuit board AF.

Figure 2:
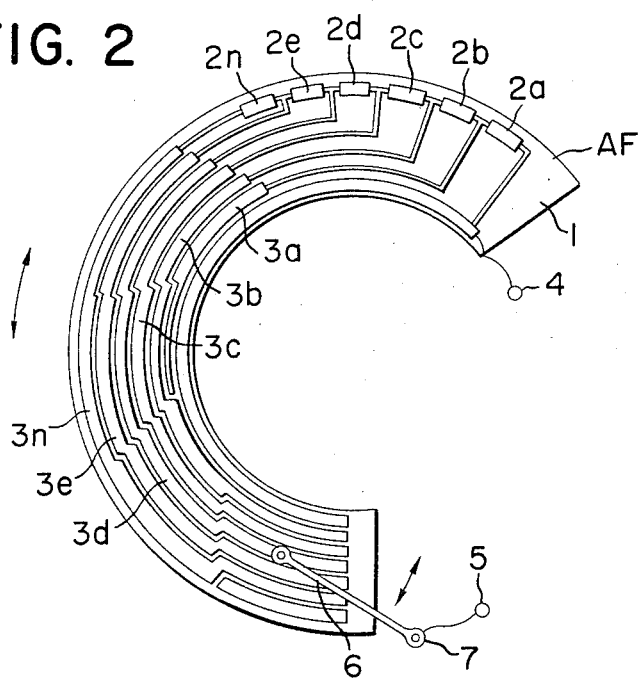
FIG. 2 is a drawing showing the variable resistor of Example 2 of the present invention.

FIG. 2 shows the printed circuit board AF on which the resistance elements 2a to 2n are connected in series. Here the resistance value which is obtained is such that the resistance value of each resistance element is added up.

Figure 4:
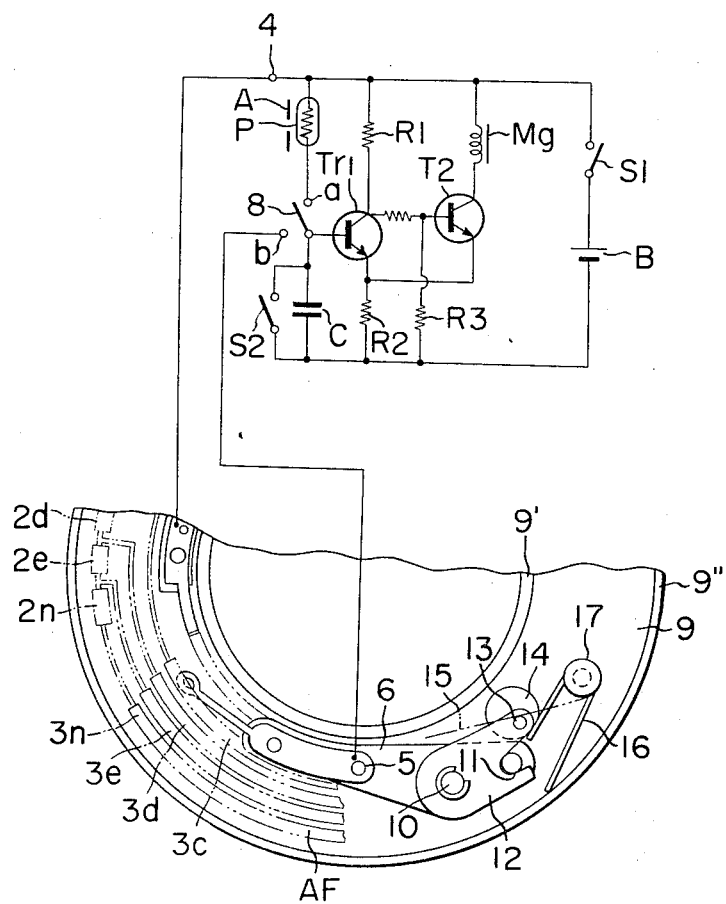
FIG. 4 is a drawing showing the variable resistor of the Example 1 as applied to a flash-auto electronic shutter circuit.

FIG. 4 shows an outline of a program type electronic shutter for automatic flash photography wherein the variable resistor of the present invention is placed within the lense barrel the automatic flash photography involves a system in which the diaphragm value automatically varies according to the distance to an object so that the optimum exposure can be obtained.

In the circuit portion of an electronic shutter P is a light receiving element and a diaphragm A for setting film sensitivity is provided in front of said light receiving element. The variable resistor according to the present invention is connected in parallel with the light receiving element P. A capacitor C is connected in series with the light receiving element P and the variable resistor through a switching switch 8 for change over between flash photographing and EE photographing. The change over switch 8 has its terminal $a$ and terminal $b$ switched by a change over lever or an automatic change over device which is not shown in the drawing but is used for switching A start switch $S_2$ opens in association with release of the shutter. Transistors $Tr_1$ and $Tr_2$ form a shutter control circuit, and resistances $R_1$ to $R_3$ determine the operating point of the shutter control circuit. A magnet Mg is connected to an output terminal of the shutter control circuit and activates a shutter closing mechanism. A power source B is connected through a power source switch $S_1$ which is closed in association with a shutter release bar.

A variable resistance is provided in the lens barrel of a camera. A fixed ring 9 includes wall parts 9', 9'' at its internal circumference and external circumference, respectively. The above-mentioned selector element 6 is rotatably attached to the fixed ring 9 by an axle 10. A pin 11 is provided at other end of the selector element 6. A lever 12 is rotatably attached to the fixed ring 9 by the axle 10, and the pin 11 engages the dented part of the lever. A pin 13 is mounted on the underside of the lever 12. This pin 13 goes through a hole 14 provided in the fixed ring 9 and contacts a cam 15 provided on a distance ring (FIG. 5). This cam 15 rotates the pin 13 around a center, the axle 10, in association with the distance adjustment of the distance ring. A leaf spring 16 is axially attached to a fixed ring 9 by an axle 17. This leaf spring 16 pushes the lever 12 in the direction of the cam 15 and has the pin 13 always contacting the cam 15. The printed circuit board AF shown by dotted lines is fixed by screw 20, etc., to a film sensitivity setting ring 19 (FIG. 5) positioned in front of the fixed ring 9.

Function of the program type electronic shutter for flash auto photographing being composed as above shall be explained. The change over switch 8 is connected or cut off to the terminal b by a flash photographing - automatic photographing change over lever (not shown in the drawing). Next, as the film sensitivity setting ring 19 is rotated, the printed circuit board AF rotates and the contacting position in circumferential direction between the printed circuit board AF and the selector 6 is determined. When the distance ring 18 is rotated for distance adjusting the selector 6 rotates around a center, the axle 5 by the cam 15 provided on the distance ring, and contacts the the conductive elements 3a to 3n at a certain position in a radial direction of the printed circuit board AF. One of the resistance elements 2a to 2n is selected by this position. When a shutter release bar (not shown in the drawing) is pressed down at this state, the power source switch $S_1$ is closed and the shutter starts to be opened. At the same time when this shutter starts opening the start switch $S_4$ is opened and a time constant circuit being composed of the variable resistor and the capacitor C starts functioning. When the terminal voltage of the capacitor C reaches a prescribed level the shutter control circuit functions, exciting the magnet Mg and emitting a shutter closing signal. Since this electronic shutter is of program type, the diaphragm is held at such diaphragm value as corresponding to shutter opening time. Therefore, if such flash initiating mechanism as closing synchronizing contact for flash by the closing signal of the magnet Mg as in U.S. Pat. No. 3,418,904 is provided at a camera, such diaphragm value as corresponding to distance and film sensitivity can be obtained.

This Example is a case wherein the variable resistor of the present invention is used to put film sensitivity information and distance-to-object information into an electronic shutter circuit for flash auto photographing. For putting information for other exposure determining factor such as guide number into an electronic shutter, the fixed ring 9 may be rotated to change its position to a camera, or the selector 6 or the printed circuit board AF may be further shifted by other exposure determining factor setting member.

What is claimed is:

1. A camera control for adjusting a circuit within a camera, comprising first camera setting means for setting one characteristic of the camera relative to a picture to be taken, second camera setting means for setting a second characteristic of the camera relative to a picture to be taken, a plurality of resistive elements, a plurality of conductive elements contacting said resistive elements, support means for holding said resistive elements and conductive elements relative to each other and moving the resistive elements and conductive elements in unison in one direction, a contact in position for contacting said conductive elements, first coupling means for coupling said first setting member to said support means so as to move said support means with said first setting means in the one direction, second coupling means for coupling said second setting means to said contact so as to move said contact with said second setting means in another direction having a component transverse to the one direction, said conductive elements and said contacts being positioned by said setting means so as to adjust the circuitry within the camera to desired exposure conditions when said setting means are adjusted.

2. A control as in claim 1, wherein said support means is made of insulating material.

3. A control as in claim 2, wherein said insulating material is an insulating material having a hollow disk shape.

4. A control as in claim 2, wherein said resistive elements are connected in parallel to each other by said con-ductive elements.

5. A control as in claim 1, wherein said resistive elements are connected in series with each other.

6. A control as in claim 1, wherein said conductive elements are foil material printed on said support means.

7. A camera control for controlling circuitry in the camera, comprising a film sensitivity setting member movable for setting a film sensitivity, a printed circuit board coupled to said film sensitivity setting member and movable by said film sensitivity setting member in a first direction, a distance setting member movable for setting a photographic distance, a selector contacting said printed circuit board and coupled for movement by the distance setting member along the board in a second direction having a component orthogonal to said first direction, a plurality of resistive elements mounted on said board and a plurality of conductive members connecting said resistive elements and mounted on said printed circuit board and forming a plurality of contacts contacting said selector at various positions of said selector so as to permit said selector to select specific resistive elements at the contacts depending on the position of said printed circuit board and said selector.

8. A control as in claim 7, wherein said film sensitivity setting member includes fixing means for fixing said printed circuit board to said film sensitivity setting member.

9. A control as in claim 7, wherein said distance setting member includes a cam mechanism for shifting the position of the selector.

10. A camera control for adjusting circuitry within the camera to desired exposure conditions, comprising first camera setting means for setting one characteristic of the camera relative to a picture to be taken, second camera setting means for setting a second characteristic of the camera relative to a picture to be taken, a plurality of resistive elements, a plurality of conductive elements contacting said resistive elements, a support member for holding said resistive elements and conductive elements relative to each other and moving the resistive elements and conductive elements in unison, a contact member in position for contacting said conductive elements, coupling means for moving said members relative to each other in one direction in response to movement of said first camera setting means and in a second direction having a component transverse to the one direction in response to movement of said second setting means, said conductive elements and said contacts being positioned by said coupling means so as to adjust the circuitry within the camera to desired exposure conditions when said setting means are adjusted.

* * * * *